United States Patent
Wallace et al.

(10) Patent No.: US 9,862,505 B2
(45) Date of Patent: Jan. 9, 2018

(54) TECHNIQUES FOR EMPLACING AN UNMANNED AERIAL VEHICLE LAUNCHER PRIOR TO LAUNCHING AN UNMANNED AERIAL VEHICLE

(71) Applicant: AAI Corporation, Hunt Valley, MD (US)

(72) Inventors: Jason J. Wallace, Waltham, MA (US); Paul Nesline, Columbia, MD (US); Richard C. Uskert, Timonium, MD (US); Samuel Padilla, Pikesville, MD (US)

(73) Assignee: AAI Corporation, Hunt Valley, MD (US)

( * ) Notice: Subject to any disclaimer, the term of this patent is extended or adjusted under 35 U.S.C. 154(b) by 508 days.

(21) Appl. No.: 14/225,751

(22) Filed: Mar. 26, 2014

(65) Prior Publication Data

US 2016/0137313 A1    May 19, 2016

(51) Int. Cl.
  *B64F 1/06*    (2006.01)
  *B64C 39/02*   (2006.01)

(52) U.S. Cl.
  CPC .............. *B64F 1/06* (2013.01); *B64C 39/024* (2013.01); *B64C 2201/084* (2013.01)

(58) Field of Classification Search
  CPC . B64C 2201/08; B64C 2201/084; B64F 1/04; B64F 1/06; F41F 1/06; F41A 27/18–27/24; F41A 23/46; F41A 23/48; F41A 23/52
  USPC .......................... 89/1.35, 37.05, 37.13, 40.02
  See application file for complete search history.

(56) References Cited

U.S. PATENT DOCUMENTS

| | | | |
|---|---|---|---|
| 2,425,783 A | * | 8/1947 | Buquor .................... F41A 23/46 89/37.13 |
| 4,945,813 A | | 8/1990 | Moscrip et al. |
| 5,779,190 A | | 7/1998 | Rambo et al. |
| 6,056,237 A | | 5/2000 | Woodland |
| 6,457,673 B1 | | 10/2002 | Miller |
| 7,165,745 B2 | | 1/2007 | McGeer et al. |
| 7,665,691 B2 | | 2/2010 | Hanzlick et al. |

(Continued)

FOREIGN PATENT DOCUMENTS

| | | | | |
|---|---|---|---|---|
| FR | 1159300 A | * | 6/1958 | ............... F41A 23/28 |
| FR | 1212135 A | * | 3/1960 | ................ F41F 1/06 |

*Primary Examiner* — Richard R Green
(74) *Attorney, Agent, or Firm* — BainwoodHuang (57) ABSTRACT

A technique is directed to launching an unmanned aerial vehicle (UAV). The technique involves positioning a UAV launcher over a ground location. The technique further involves installing, after the UAV launcher is positioned over the ground location and prior to launching the UAV, an anchor into the ground location to anchor the UAV launcher to the ground location. The technique further involves operating, after the UAV launcher is anchored to the ground location, the UAV launcher to impart launching force onto the UAV to launch the UAV, the anchor holding the UAV launcher substantially in place at the ground location to minimize energy loss as the UAV launcher imparts launching force onto the UAV. In some arrangements, the UAV launcher is capable of pivoting while remaining anchored between launches to accommodate changes in wind direction while maintaining substantial connection to the ground location for enhanced consistency and performance.

19 Claims, 8 Drawing Sheets

(56) References Cited

U.S. PATENT DOCUMENTS

| | | |
|---|---|---|
| 7,966,763 B1 | 6/2011 | Schneider et al. |
| 8,115,149 B1 * | 2/2012 | Manole ............... F42B 10/18 |
| | | 244/190 |
| 8,209,897 B2 | 7/2012 | Schneider et al. |
| 8,336,816 B2 | 12/2012 | Miller |
| 8,511,607 B2 | 8/2013 | Robinson |
| 8,573,536 B2 | 11/2013 | McGeer et al. |
| 8,584,985 B2 | 11/2013 | Woolley et al. |
| 2013/0277497 A1 * | 10/2013 | Jones .................. B64F 1/06 |
| | | 244/63 |

* cited by examiner

TECHNIQUES FOR EMPLACING AN UNMANNED AERIAL VEHICLE LAUNCHER PRIOR TO LAUNCHING AN UNMANNED AERIAL VEHICLE

BACKGROUND

An unmanned aerial vehicle (UAV) is an aircraft which flies without a pilot on board. Rather, a ground control station (GCS) typically programs the UAV with a flight plan (or the UAV receives human control from the GCS in real time). A launcher (if necessary) then launches the UAV into flight, and the UAV executes the flight plan. If a communications link between the UAV and the GCS remains available, the UAV can convey status to the GCS as well as receive control input from the GCS while the UAV is in flight.

To launch a UAV into flight using the launcher, a human launch team typically parks the launcher at a takeoff site. Since the UAV is normally near maximum takeoff gross weight (TOGW) with a full fuel load and payloads at takeoff time, the team typically points the launcher into the wind to maximize lift. The team then loads the UAV onto the launcher, and activates the launcher which drives the UAV forward (e.g., using pneumatics, hydraulics, cables, etc.) to launch the UAV.

SUMMARY

Unfortunately, there are deficiencies to the above-described conventional approach to launching a UAV by simply parking a launcher at a takeoff site, pointing the launcher into the wind, and launching the UAV. For example, there can be significant energy loss during launch because the UAV pushes the launcher backwards as the UAV takes off. Even if the launch team attempts to lock the wheels of the launcher (e.g., by locking the wheel brakes, by using wheel blocks, etc.), the launcher will still tend to recoil in the opposite direction during launch thus resulting in energy loss. As a result, the UAV experiences less lift.

Additionally, as the launcher moves backwards during launch, the launcher may dig itself into the ground. As a result, if the launch team launches another UAV immediately thereafter and in the same direction while the launcher is dug-in, the launch team will experience a different launch behavior compared to the first launch (e.g., greater lift due to less recoil and less energy loss). Accordingly, multiple launches may create inconveniences such as a need to provide different flight plans or a need to cope with different launch behaviors in real time. Moreover, differences in post-launch behavior may be inconsistent and difficult to predict due to variations in the terrain of the takeoff site (e.g., sandy terrain, rocky terrain, grassy terrain, etc.).

Furthermore, suppose that the human team then wishes to reuse the launcher after some period of time has passed (e.g., a few hours). In this situation, if the wind direction has changed since the initial launch, launching a new UAV (or the same UAV) in the initial direction while the launcher is dug-in will be sub-optimal since the UAV is no longer being launched directly into the wind. Alternatively, the launch team must free the launcher from its dug-in condition before re-pointing the launcher into the new wind direction in order to launch the UAV directly into the wind.

In contrast to the above-described conventional approach to launching a UAV, improved techniques are directed to anchoring a UAV launcher to the ground prior to launching a UAV. With the UAV launcher firmly anchored in place, the UAV can be launched with maximum energy transfer. Furthermore, in some arrangements, the UAV launcher can be aimed and re-aimed (e.g., pivoted) while the UAV launcher remains anchored to the ground. As a result, the UAV launcher can be pointed in different directions if the wind direction changes over time, without any need to un-anchor and then re-anchor the UAV launcher between launches.

One embodiment is directed to a method of launching a UAV. The method includes positioning a UAV launcher over a ground location, the UAV launcher being constructed and arranged to impart launching force onto the UAV to launch the UAV into the air from the ground location. The method further includes installing, after the UAV launcher is positioned over the ground location and prior to launching the UAV into the air from the ground location, an anchor into the ground location to anchor the UAV launcher to the ground location. The method further includes operating, after the UAV launcher is anchored to the ground location, the UAV launcher to impart launching force onto the UAV to launch the UAV into the air from the ground location, the anchor holding the UAV launcher substantially in place at the ground location to minimize energy loss as the UAV launcher imparts launching force onto the UAV.

In some arrangements, the method further includes rotating the UAV launcher about a pivot point while the UAV remains anchored to the ground location. Accordingly, the UAV launcher can be adjusted to compensate for changes in wind direction while remaining anchored to the ground location.

In some arrangements, the UAV launcher is initially aimed in a first direction when the UAV launcher is operated to impart launching force onto the UAV to launch the UAV into the air from the ground location. In these arrangements, rotating the UAV launcher about the pivot point includes pivoting, after the UAV launcher is initially aimed in the first direction and the UAV is launched into the air, the UAV launcher around the pivot point to aim the UAV launcher in a second direction that is different from the first direction.

In some arrangements, the method further includes re-operating, after the UAV launcher is pivoted around the pivot point to aim the UAV launcher in the second direction, the UAV launcher to impart launching force onto the UAV to launch the UAV into the air in the second direction. In these arrangements, the anchor continues to hold the UAV launcher substantially in place at the ground location to minimize energy loss as the UAV launcher imparts launching force onto the UAV to launch the UAV into the air in the second direction.

In some arrangements, the anchor includes a support member which is coupled to a frame of the UAV launcher. In these arrangements, installing the anchor into the ground location includes fastening the support member to the ground location to prevent the frame of the UAV launcher from moving relative to the ground location when the UAV launcher imparts launching force onto the UAV.

In some arrangements, fastening the support member to the ground location includes embedding at least an end portion of the support member within the ground. Along these lines, an auger is capable of drilling a hole into the ground, and then the anchor (e.g., a pin) can be set into the hole to maintain the UAV launcher in place. Alternatively, the auger itself can be screwed and left in the ground as the anchor. Other configurations are suitable for use as well.

In some arrangements, the method further includes (i) during a first time period, disconnecting the frame of the UAV launcher from the support member to remove the UAV launcher away from the ground location, and (ii) during a second time period after the first time period, reconnecting the frame of the UAV launcher to the support member to re-anchor the UAV launcher to the ground location. Accordingly, the same ground location can be used over again (e.g., on a second mission, routinely, etc.).

In some arrangements, the support member and the pivot point are co-located. In these arrangements, rotating the UAV launcher about the pivot point includes rotating the UAV launcher about the support member. For example, the support member is capable of operating as a hinge upon which the UAV launcher pivots.

In some arrangements, the anchor includes (i) a base plate and (ii) a coupler which couples to the based plate, the coupler being attached to the UAV launcher. In these arrangements, installing the anchor into the ground location to anchor the UAV launcher to the ground location includes implanting the base plate into the ground, and fastening the coupler to the implanted base plate.

In some arrangements, the anchor includes (i) a curved track and (ii) a guide which is constructed and arranged to ride along the curved track, the guide being attached to the UAV launcher. In these arrangements, installing the anchor into the ground location to anchor the UAV launcher to the ground location includes affixing the curved track to the ground, and fitting the guide within the curved track to enable the guide to ride along the curved track while the UAV launcher remains anchored to the ground location. Here, the UAV launcher pivots around the pivot point while the guide rides along the curved track.

Other embodiments are directed to UAV launching systems, apparatus, assemblies, etc. Some embodiments are directed to various methods and components which are involved in launching UAVs.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to anchoring an unmanned aerial vehicle (UAV) launcher to a ground location prior to launching a UAV. With the UAV launcher firmly anchored to the ground location, the UAV can be launched with maximum energy transfer. Furthermore, in some arrangements, the UAV launcher can be re-aimed (e.g., pivoted) while the UAV launcher remains anchored to the ground location. Accordingly, the UAV launcher can be pointed in different directions as the wind direction changes over time without any need to un-anchor and then re-anchor the UAV launcher between launches.

Figure 1:
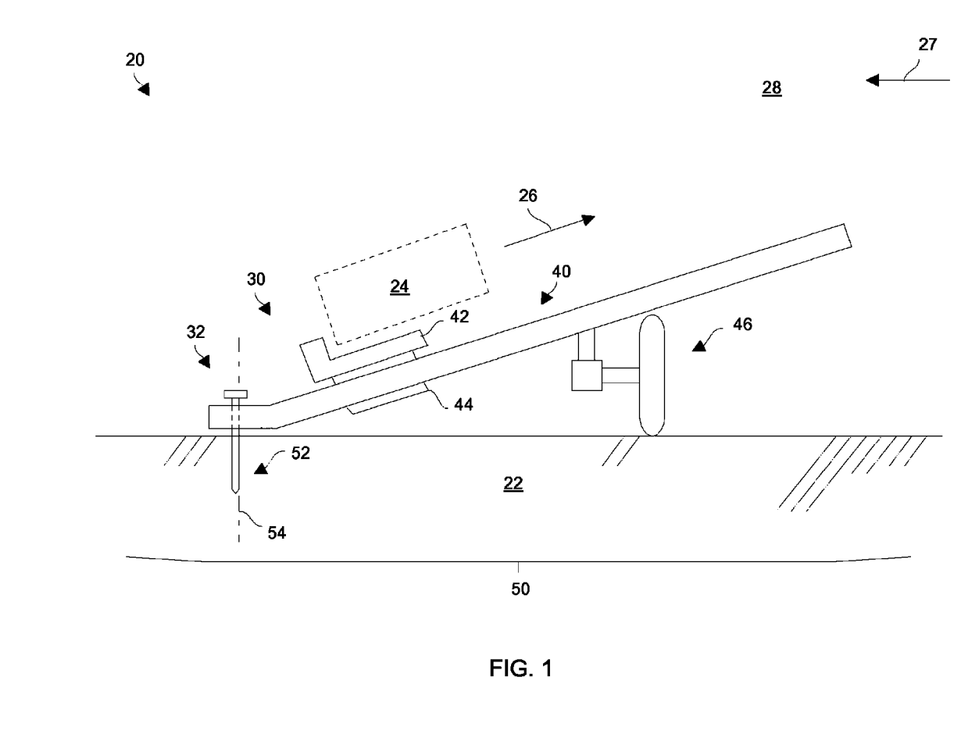
FIG. 1 is a diagram of an unmanned aerial vehicle (UAV) launching apparatus which anchors to the ground prior to launching a UAV.

FIG. 1 shows a UAV launching apparatus 20 which anchors to the ground 22 prior to launching a UAV 24 in a direction 26 into the air 28. The UAV 24 is shown as a dashed block in FIG. 1 for simplicity since UAVs are available in different styles, configurations, and form factors. When the launch direction of the UAV launching apparatus 20 is pointed into the wind (e.g., see arrow 27), the UAV 24 encounters maximum wind speed during take-off and thus receives maximum lift.

The UAV launching apparatus 20 includes a UAV launcher 30 and an anchor 32 which is connected to the UAV launcher 30. The UAV launcher 30 includes a frame (or support) 40, a UAV mount 42, and a propulsion mechanism 44.

The frame 40 is constructed and arranged to provide structural support during transportation of the UAV launcher 30 and during UAV launches. By way of example, the frame 40 is provisioned with wheels 46 to facilitate towing during transportation, and which can be turned sideways (as shown in FIG. 1) to facilitate rotation of the frame 40 (e.g., to accommodate changes in wind direction).

The UAV mount 42 is configured to interface with a UAV 24. In particular, the UAV mount 42 is constructed and arranged to make direct contact with the UAV 24 to steadily carry and hold the UAV 24 in place prior to launch (e.g., during final setup and checking just prior to takeoff). Additionally, the UAV mount 42 imparts force on the UAV 24 and allows the UAV 24 to easily escape the launcher 30 during takeoff.

The propulsion mechanism 44 is configured to move the UAV mount 42 relative to the frame 40 to impart launching force onto the UAV 24 during launch. In particular, the propulsion mechanism is constructed and arranged to drive the UAV mount 42 forward (see arrow 26 in FIG. 1) with great force to maximize UAV takeoff velocity. Examples of suitable propulsion mechanisms include pneumatic drive mechanisms, hydraulic drive mechanisms, cable/bungee drive mechanisms and so on.

The anchor 32 is constructed and arranged to firmly anchor the UAV launcher 30 to the ground 22. Such anchoring prevents the UAV launcher 30 from moving substantially backwards when the propulsion mechanism 44 drives the UAV mount 42 forward in the direction 26 during UAV takeoff. Rather, the anchor 32 fastens the UAV launcher 30 rigidly in place over a ground location 50. Accordingly, energy loss during UAV takeoff is minimized and the UAV 24 is able to achieve maximum lift.

By way of example, the anchor 32 is shown in FIG. 1 as a pin-style fastener. In such an arrangement, the anchor 32 includes a stake-shaped member which is implanted into the ground 22. An end portion 52 of the stake-shaped member is embedded deeply within the ground 22 to prevent the anchor 32 from releasing and to firmly hold the UAV launcher 30 in place during launch. Such an anchor 32 can be emplaced using a hammer, a jack, other machinery, robotic equipment, and so on.

As will be explained in further detail shortly, in some arrangements, the anchor 32 enables the UAV launcher 30 to be aimed in different directions while the UAV launcher 30 remains anchored to the ground 22. Along these lines, the UAV launcher 30 is able to pivot about a pivot point (see dashed line 54 in FIG. 1). As a result, the UAV launcher 30 does not need to be unanchored and then re-anchored in order to keep the UAV launcher 30 pointed into the wind if there is a change in wind direction between launches.

To launch a UAV 22, a team of users (i.e., one or more users) positions the UAV launcher 30 over a ground location 50. Next, the team of users installs the anchor 32 into the ground location 50 to anchor the UAV launcher 30 to the ground location 50. Then, the team of users loads the UAV 24 onto the launcher 30 and launches the UAV 24.

During the launch, the UAV launcher 30 imparts launching force onto the UAV 24 to launch the UAV 24 into the air 26 from the ground location 50. The anchor 32 holds the UAV launcher 24 substantially in place at the ground location 50 to achieve maximum energy transfer. Further details will now be provided with reference to FIGS. 2 through 4.

Figure 2:
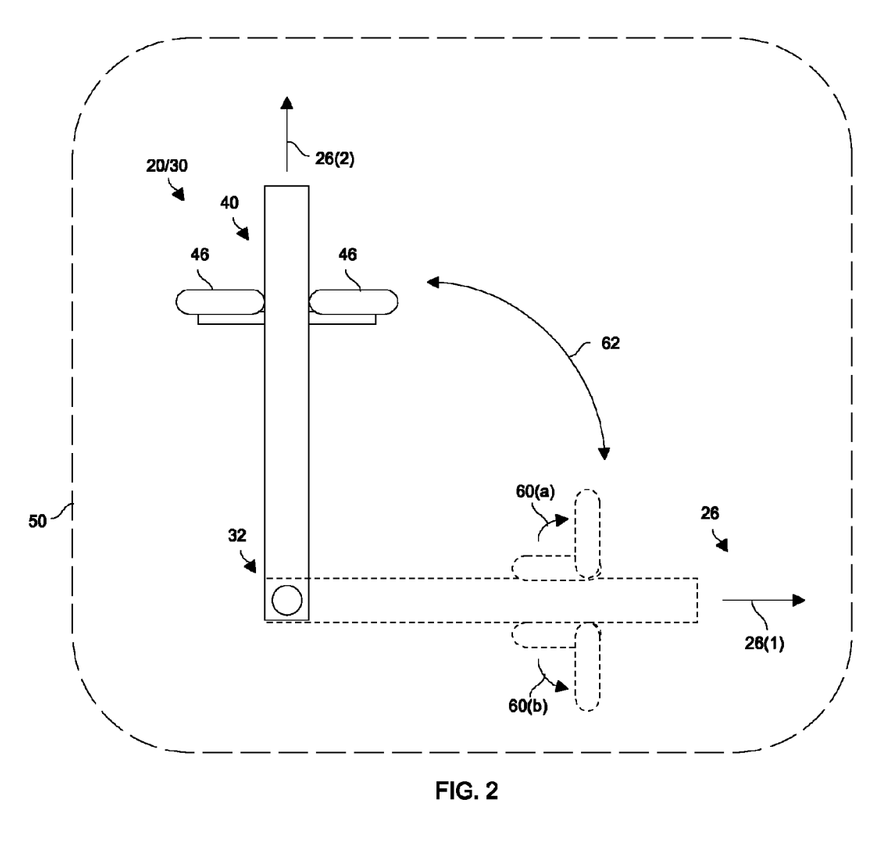
FIG. 2 is a diagram illustrating how the anchored UAV launching apparatus of FIG. 1 can be rotated between UAV launches in order to point in different directions.
Figure 3:
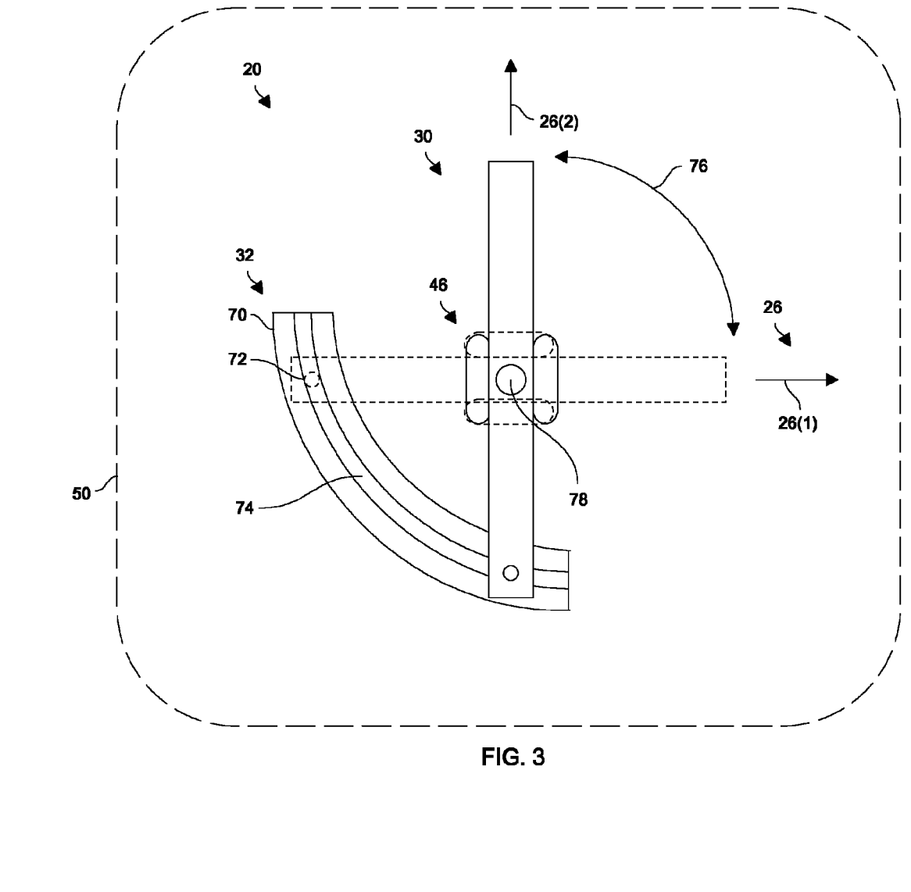
FIG. 3 is a diagram of an alternative anchored UAV launching apparatus which can be rotated between UAV launches in order to point in different directions.
Figure 4:
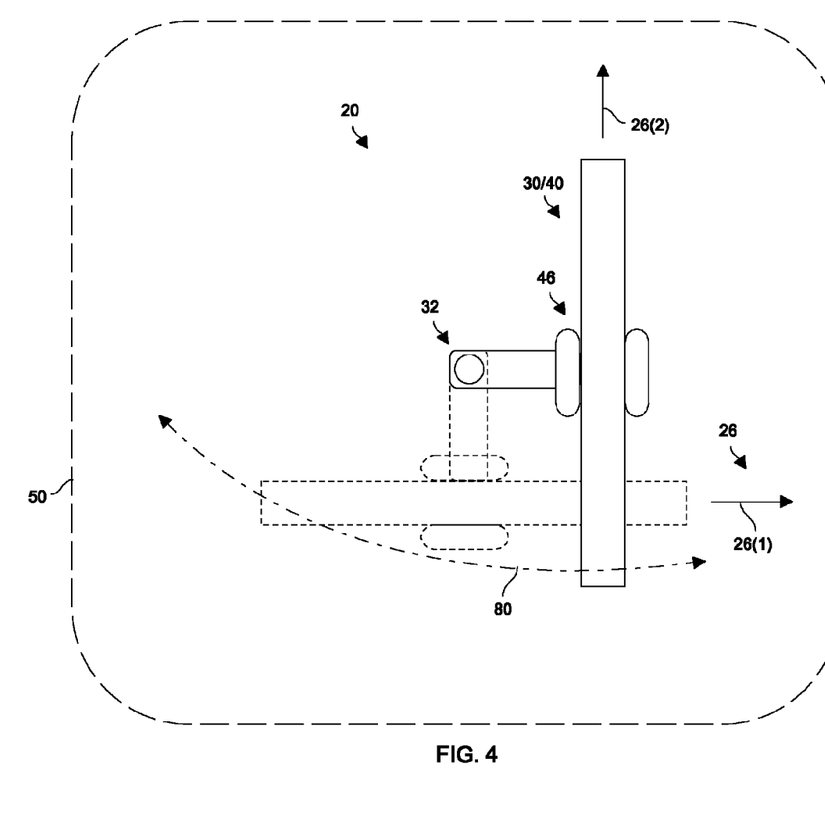
FIG. 4 is a diagram of an another anchored UAV launching apparatus which can be rotated between UAV launches in order to point in different directions.

FIGS. 2 through 4 show various anchoring configurations which are suitable for use in anchoring a UAV launching apparatus 20 over a ground location 50 during UAV launch. FIG. 2 shows a general top view of the UAV launching apparatus 20 which uses the anchoring system of FIG. 1 or a similar anchoring system. FIG. 3 shows a general top view of the UAV launching apparatus 20 which uses an alternative anchoring system. FIG. 4 shows a general top view of the UAV launching apparatus 20 which uses yet another anchoring system.

As shown in FIG. 2, a team of users initially positions the UAV launching apparatus 20 (dashed lines) over a ground location 50 and points the UAV launching apparatus 20 in a first UAV launching direction 26(1) (e.g., into the current wind direction). For example, the UAV launching apparatus 20 may be towed by a motorized vehicle to the ground location 50 and then detached from the motorized vehicle and aimed in the direction 26(1). During this time, the wheels 46 of the frame 40, which may be the same wheels that are used to transport the UAV launching apparatus 20, can be splayed substantially sideways (see arrows 60(a), 60(b)) to facilitate side to side movement of the frame 40 to precisely aim the UAV launching apparatus 20 in the direction 26(1).

Also, at this time, the team of users anchors the UAV launching apparatus 20 to the ground location 54. In the arrangement of FIG. 2, the anchor 32 is located near the back end of the frame 40 and is installed into the ground 22 (e.g., see FIG. 1). Accordingly, the anchor 32 robustly and reliably holds the UAV launcher 30 in place during UAV launch so that energy loss to due recoil is minimized.

At some later time, the UAV launching apparatus 20 is rotated and pointed in a new UAV launch direction 26(2) for a subsequent UAV launch (see arrow 62 in FIG. 2). As mentioned earlier, the wheels 46 facilitate turning of the UAV launching apparatus 20 to the new direction 26. As the UAV launching apparatus 20 rotates, the anchor 32 operates as the pivot point or hinge (i.e., the axis of rotation is about the anchor 32).

It should be understood that, in the arrangement of FIG. 2, the anchor 32 holds the UAV launcher 30 in place during UAV launches as well as when the UAV launching apparatus 20 rotates to the different directions 26. That is, the team of users can continue to change the direction 26 of the UAV launching apparatus 20 (e.g., rotating the UAV launcher 30 to the left or right) without any need to un-anchor the UAV launching apparatus 20 and then re-anchor the UAV launching apparatus 20.

As shown in FIG. 3, the UAV launching apparatus 20 includes a UAV launcher 30 having wheels 46 and an anchor 32 for anchoring the UAV launcher 30 in place over a ground location 50. The anchor 32 includes a curved track constructed and arranged to affix to the ground, and a guide 72 attached to the UAV launcher 30. The guide 72 is constructed and arranged to (i) ride along the curved track 70 and (ii) fit within the curved track 70, e.g., a tab member or pin held within a slot or along a rail 74 defined by the curved track 70. As a result, the anchor 32 continuously holds the UAV launcher 30 to the ground even while the UAV launcher 30 is rotated to different directions 26.

During operation, a team of users initially positions the UAV launching apparatus 20 over the ground location 50 and points the UAV launching apparatus 20 in a first UAV launching direction 26(1) (e.g., into the current wind direction). In this arrangement, the wheels 46 of the frame 40 can remain on the same axle or in the same orientation that enables the UAV launching apparatus 20 to be towed.

Also, at this time, the team of users anchors the UAV launching apparatus 20 to the ground location 54. In particular, the team fastens the curved track 70 to the ground (e.g., using pins/stakes/etc.). Next, the team engages the guide 72 with the curved track 70. As a result, the anchor 32 robustly and reliably holds the UAV launcher 30 in place during UAV launch so that energy loss to due recoil is minimized.

At some later time, the UAV launching apparatus 20 is rotated and pointed in a new UAV launch direction 26(2) for a subsequent launch (see arrow 76 in FIG. 3). During such rotation, the wheels 46 facilitate turning of the UAV launching apparatus 20 to the to the new direction 26. In particular, as the UAV launching apparatus 20 rotates, the center of the axle of the wheels 46 generally operates as the pivot point 78.

It should be understood that, in the arrangement of FIG. 3, the anchor 32 (i.e., the combination of the curved track 70 and the guide 72) holds the UAV launcher 30 in place during UAV launches as well as when the UAV launching apparatus 20 rotates to the different directions 26. That is, the team of users can continue to change the direction 26 of the UAV launching apparatus 20 without any need to un-anchor the UAV launching apparatus 20 and then re-anchor the UAV launching apparatus 20.

As shown in FIG. 4, a team of users initially positions the UAV launching apparatus 20 over a ground location 50 and points the UAV launching apparatus 20 in a first UAV launching direction 26(1) (e.g., into the current wind direction). For example, the UAV launching apparatus 20 may be towed by a motorized vehicle to the ground location 50 and then detached from the motorized vehicle and aimed in the direction 26(1). At this time, the team of users anchors the UAV launching apparatus 20 to the ground location 50. In the arrangement of FIG. 4, the anchor 32 is located obliquely along a side of the UAV launcher 30. Nevertheless, due to structural strength in framing and competent fastening of the anchor 32 to the ground, the anchor 32 robustly and reliably holds the UAV launcher 30 in place during UAV launch so that energy loss to due recoil is minimized.

At some later time, the UAV launching apparatus 20 is rotated and pointed in a new UAV launch direction 26(2) for a subsequent launch (see arrow 80 in FIG. 4). In this arrangement, the team of users swings the back end of the UAV launcher 30 to properly point the UAV launcher 30 in a desired direction 26. As mentioned earlier, the wheels 46 facilitate turning of the UAV launching apparatus 20 to the new direction 26. As the UAV launching apparatus 20 rotates, the anchor 32 operates as the pivot point or hinge (i.e., the axis of rotation is about the anchor 32).

It should be understood that, in the arrangement of FIG. 4, the anchor 32 holds the UAV launcher 30 in place during UAV launches as well as when the UAV launching apparatus 20 rotates to the different directions 26. Accordingly, the team of users can continue to change the direction 26 of the UAV launching apparatus 20 without any need to un-anchor the UAV launching apparatus 20 and then re-anchor the UAV launching apparatus 20.

By way of example only, the UAV launching apparatus 20 of FIGS. 2-4 are shown rotated by 90 degrees. It should be understood that the UAV launching apparatus 20 can be rotated by different amounts (e.g., 30 degrees, 45 degrees, 135 degrees, 180 degrees) and in different directions (e.g., clockwise or counterclockwise). Along these lines, the length of the curved track 70 in FIG. 3 can be altered (e.g., shortened, extended, etc.) to alter the available amount of rotation. Further details will now be provided with reference to FIGS. 5 through 7.

Figure 5:
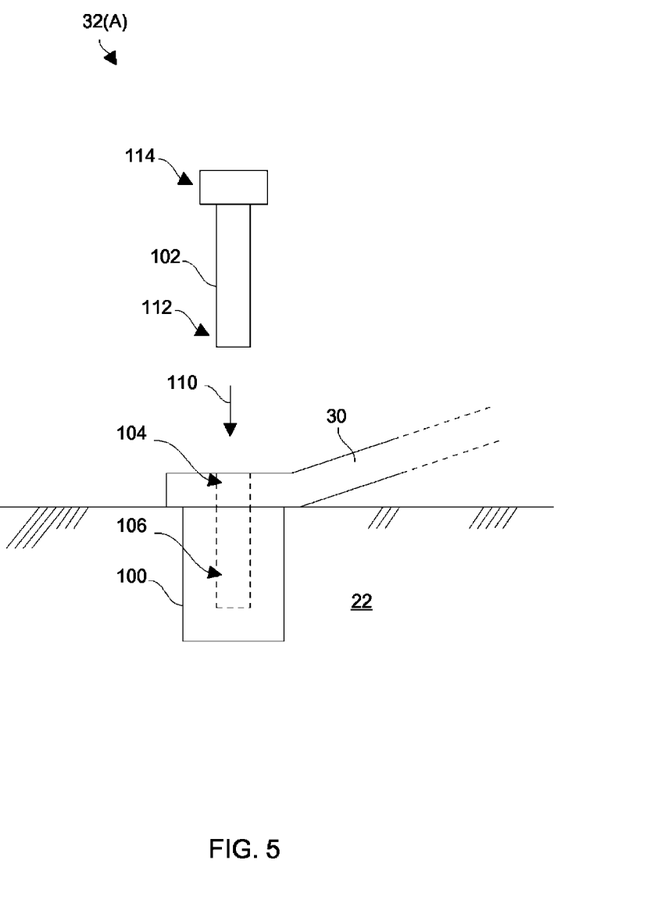
FIG. 5 is a diagram of a peg-style anchor which is capable of anchoring a UAV launcher.
Figure 6:
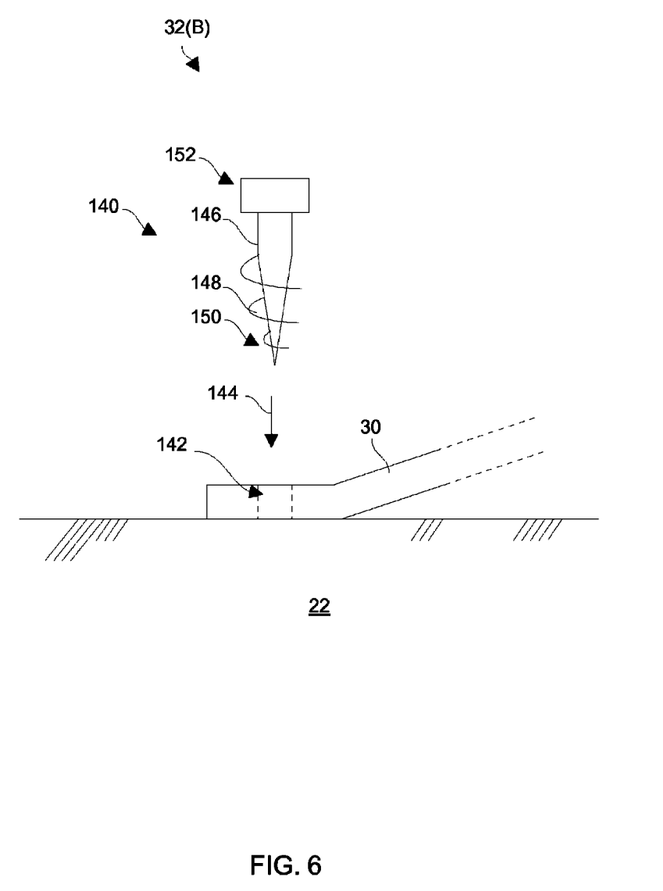
FIG. 6 is a diagram of an auger-style anchor which is capable of anchoring a UAV launcher.
Figure 7:
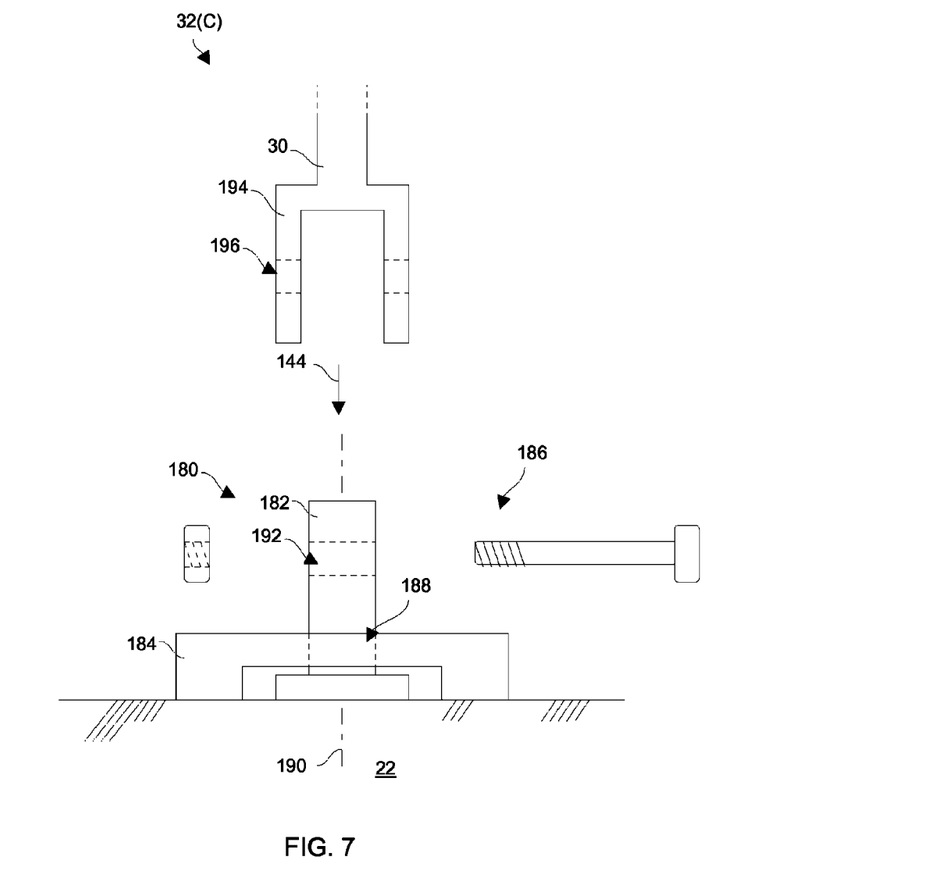
FIG. 7 is a diagram of a bearing/plate-style anchor which is capable of anchoring a UAV launcher.

FIGS. 5 through 7 show side views of various anchors 32 which are suitable for use in anchoring a UAV launching apparatus 20 over a ground location 50 during UAV launch. FIG. 5 shows a peg-style anchor 32(A). FIG. 6 shows an auger-style anchor 32(B). FIG. 7 shows a bearing/plate-style anchor 32(C). Such anchors 32 are suitable for a variety of UAV launcher anchoring situations such as those illustrated in FIGS. 2 and 4. Additionally, such anchors 32 are suitable alternatives to a simple pin-style anchor 32 (also see FIG. 1).

In connection with the peg-style anchor 32(A) of FIG. 5, a team of users first rigidly embeds a base 100 within the ground 22. In some arrangements, the base 100 is a pre-formed structure (e.g., a pylon-shaped member which is driven or screwed into the ground 22). In other arrangements, the base 100 is established on site (e.g., a foundation containing poured concrete).

Next, a peg-shaped member 102 is inserted through a hole (or slot) 104 of the UAV launcher 30 and into a cavity 106 of the base 100 (see arrow 110 in FIG. 5). The hole 104 can be within a coupling portion of the launcher frame 40 (also see FIG. 1) or within an extension (perhaps considered part of the anchor 32(A)) which firmly connects to the launcher frame 40.

With an end portion 112 of the peg-shaped member 102 securely inserted into the base 100, a wider top 114 of the peg-shaped member 102 firmly ties the UAV launcher 30 to the ground 22. Accordingly, the UAV launcher 30 does not move backwards during UAV launch and energy loss during launch is minimized. Moreover, the UAV launcher 30 can be re-directed (e.g., in response to changes in wind direction) while the anchor 32(A) remains in place.

In connection with the auger-style anchor 32(B) of FIG. 6, a team of users first screws an auger-shaped member 140 into the ground 22 through a hole 142 of the UAV launcher 30 (see arrow 144 in FIG. 6). The auger-shaped member 140 includes a cylindrical mid-portion 146, and threads 148 which wind around the cylindrical mid-portion 146.

To facilitate installation, the team of users may employ specialized equipment (e.g., machinery) to thread the auger-shaped member 140 into place. The hole 142 can be within a coupling portion of the launcher frame 40 (also see FIG. 1) or within an extension (perhaps considered part of the anchor 32(B)) which firmly connects to the launcher frame 40.

With an end portion 150 of the auger-shaped member 140 securely installed in the ground 22, a wider top 152 of the auger-shaped member 140 firmly ties the UAV launcher 30 to the ground 22. Thus, the UAV launcher 30 does not move backwards during UAV launch and energy loss during launch is minimized. Furthermore, the UAV launcher 30 can be re-directed (e.g., in response to changes in wind direction) while the anchor 32(B) remains in place. In some arrangements, the auger-style anchor is permanently attached to the launcher frame 40 and driven into the ground manually, by turning through mechanical advantage, or using an on-launcher system (e.g., pneumatic, hydraulic, etc.). The auger screw may be hinged such that it can be stowed, in some manner, parallel or relatively parallel to the axis of the launcher frame 40.

In connection with the bearing/plate-style anchor 32(C) of FIG. 7, the anchor 32(C) includes plate assembly 180 having a rotatable member 182, a retainer (or base plate) 184, and hardware 186. The retainer 184 is fastened to the ground 22 (e.g., using stakes, pins, stakes, pins, poured concrete, etc.) and the details are omitted from FIG. 7 for simplicity. The rotatable member 182 fits within the retainer 184 and extends through a top hole 188 defined by the retainer 184. The rotatable member 182 is capable of rotating about an axis 190 within the retainer 184.

To install the anchor 32(C) and attach the UAV launcher 30, a team of users first rigidly fastens the plate assembly 180 to the ground 22. In particular, the team sits the rotatable member 182 on the ground 22, and places the retainer 184 over the rotatable member 182 allowing the rotatable member 182 to extend through the hole 188 defined by the retainer 184. The team then fastens the retainer 184 to the ground 22. In some arrangements, the plate assembly 180 is permanently attached to the ground 22 and the team is able to routinely disconnect and re-connect one or more UAV launchers 30 to the same plate assembly 180. For example, a patrol may decide to remove the UAV launching apparatus 20 from the original ground location 50 to use the UAV launching apparatus 20 at another ground location 50, but then return to reuse the original ground location 50.

Next, the team connects a coupler of the UAV launcher 30 to the plate assembly 180 using the hardware 186. By way of example, the rotatable member 182 defines a hole 192, and a coupling portion 194 of the UAV launcher 30 defines complementary holes 196. The team then aligns the holes 192, 194, and feeds the hardware 186 (e.g., a set of nuts and bolts) through the holes 192, 196 to connect the portion 192 of the UAV launcher 30 to the plate assembly 180. The hole 192 can be within a portion of the UAV frame 40 (also see FIG. 1) or within an extension (perhaps considered part of the anchor 32(C)) which firmly connects to the UAV frame 40. Further details will now be provided with reference to FIG. 8.

Figure 8:
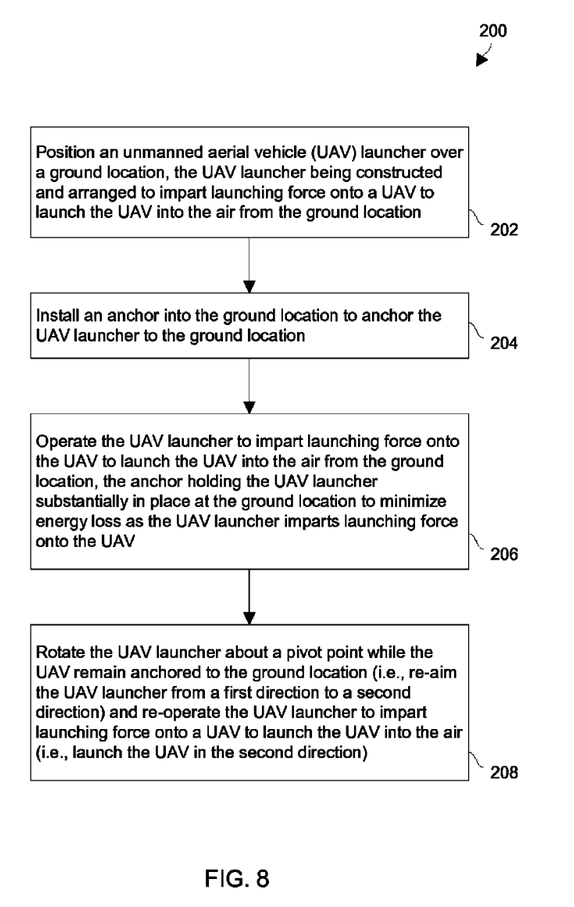
FIG. 8 is a flowchart of a procedure which is performed when launching a UAV from a UAV launcher.

FIG. 8 is a flowchart of a procedure 200 which is performed by a team of users (i.e., one or more users) when launching a UAV from a UAV launcher. At 202, the team positions a UAV launcher over a ground location, the UAV launcher being constructed and arranged to impart launching force onto the UAV to launch the UAV into the air from the ground location. Examples of suitable UAV launchers include those which utilize utilize pneumatic or hydraulic drives, cable or bungee style launchers, and so on.

At 204, the team installs an anchor into the ground location to anchor the UAV launcher to the ground location. Example anchors include stakes, pins, pegs, augers, screws, curved tracks, rails, implanted plates, and other hardware-style anchoring mechanisms.

At 206, the team operates the UAV launcher to impart launching force onto the UAV to launch the UAV into the air from the ground location. The anchor holds the UAV launcher substantially in place at the ground location to minimize energy loss as the UAV launcher imparts launching force onto the UAV. Here, the UAV launcher does not move backwards and is not susceptible to differences in terrain. Rather, such anchoring during launching results in consistency and maximum energy transfer to the UAV. Accordingly, each UAV launch enjoys maximum lift and predictability.

At 208, the team rotates the UAV launcher about a pivot point while the UAV launcher remains anchored to the ground location. Additionally, the team then launches another UAV (i.e., the same UAV, a new UAV, etc.) from the rotated UAV launcher. Such operation allows the UAV launcher to be easily re-aimed. That is, the team is not forced to decide between launching the UAV in a sub-optimal direction if the wind direction has changed, or to un-anchor and re-anchor the UAV launcher when otherwise turning the UAV launcher.

As described above, improved techniques are directed to anchoring a UAV launcher 30 to the ground 22 prior to launching a UAV 24. With the UAV launcher 30 firmly anchored in place, the UAV 24 can be launched with maximum energy transfer. Furthermore, in some arrangements, the UAV launcher 30 can be aimed and re-aimed (e.g., pivoted) while the UAV launcher 30 remains anchored to the ground 22. As a result, the UAV launcher 30 can be pointed in different directions if the wind direction changes over time, without any need to un-anchor and then re-anchor the UAV launcher 30 between launches.

It should be understood that the above-described techniques work with a variety of different ground locations. Examples of suitable ground locations include Earth, platform, floor, sandy terrains, rocky terrains, grassy terrains, or any other base, structure or footing upon which a launcher can be emplaced. In some arrangements, the above-described techniques are used on ground vehicles, shipboard/sea-borne platforms, other vessel surfaces, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that the above-described anchoring techniques can be used on other types of launching devices which otherwise result in sub-optimal results if allowed to move backwards during launch. Such other launching devices include rocket launchers, grenade launchers, water vehicle launchers, and so on. Such modifications and enhancements are intended to belong to various embodiments of the disclosure.

What is claimed is:

1. A method of launching an unmanned aerial vehicle (UAV), the method comprising:
   positioning a UAV launcher over a ground location, the UAV launcher being constructed and arranged to impart launching force onto the UAV to launch the UAV into the air from the ground location;
   after the UAV launcher is positioned over the ground location and prior to launching the UAV into the air from the ground location, installing an anchor into the ground location to anchor the UAV launcher to the ground location; and
   after the UAV launcher is anchored to the ground location, operating the UAV launcher to impart launching force onto the UAV to launch the UAV into the air from the ground location, the anchor holding the UAV launcher substantially in place at the ground location to minimize energy loss as the UAV launcher imparts launching force onto the UAV; and
   rotating the UAV launcher about a pivot point while the UAV launcher remains anchored to the ground location;
   wherein the UAV launcher includes a frame, a mount, and a propulsion mechanism that is constructed and arranged to move the mount relative to the frame during UAV launching;
   wherein the anchor is detached from the UAV launcher while the UAV launcher is positioned over the ground location, and
   wherein installing the anchor into the ground location includes:
      after the UAV launcher is positioned over the ground location and aimed in a particular direction, implanting the anchor into the ground location and attaching the implanted anchor to the frame of the UAV launcher, the implanted anchor securing the frame of the UAV launcher to the ground location when the propulsion mechanism of the UAV launcher moves the mount of the UAV launcher relative to the frame of the UAV launcher to impart launching force onto the UAV during UAV launching.

2. A method as in claim 1 wherein the UAV launcher is initially aimed in a first direction when the UAV launcher is operated to impart launching force onto the UAV to launch the UAV into the air from the ground location; and wherein rotating the UAV launcher about the pivot point includes:
   after the UAV launcher is initially aimed in the first direction and the UAV is launched into the air, pivoting the UAV launcher around the pivot point to aim the UAV launcher in a second direction that is different from the first direction.

3. A method as in claim 2, further comprising:
   after the UAV launcher is pivoted around the pivot point to aim the UAV launcher in the second direction, re-operating the UAV launcher to impart launching force onto the UAV to launch the UAV into the air in the second direction, the anchor continuing to hold the UAV launcher substantially in place at the ground location to minimize energy loss as the UAV launcher imparts launching force onto the UAV to launch the UAV into the air in the second direction.

4. A method as in claim 3 wherein the anchor includes a support member which is configured to couple to the frame of the UAV launcher; and wherein implanting the anchor into the ground location includes:
   fastening the support member to the ground location.

5. A method as in claim 4 wherein fastening the support member to the ground location includes:
   embedding at least an end portion of the support member within the ground.

6. A method as in claim 4, further comprising:
   during a first time period, disconnecting the frame of the UAV launcher from the support member to remove the UAV launcher away from the ground location, and
   during a second time period after the first time period, reconnecting the frame of the UAV launcher to the support member to re-anchor the UAV launcher to the ground location.

7. A method as in claim 4 wherein the support member and the pivot point are co-located; and wherein rotating the UAV launcher about the pivot point includes rotating the UAV launcher about the support member.

8. A method as in claim 3 wherein the anchor includes (i) a base plate and (ii) a coupler which couples to the based plate, the coupler being attached to the UAV launcher; and wherein implanting the anchor into the ground location to anchor the UAV launcher to the ground location includes:
   implanting the base plate into the ground, and
   fastening the coupler to the implanted base plate.

9. A method as in claim 3 wherein the anchor includes (i) a curved track and (ii) a guide which is constructed and arranged to ride along the curved track, the guide being attached to the UAV launcher; and wherein implanting the anchor into the ground location includes:
   affixing the curved track to the ground, and
   fitting the guide within the curved track to enable the guide to ride along the curved track while the UAV launcher remains anchored to the ground location, the UAV launcher pivoting around the pivot point while the guide rides along the curved track.

10. A method as in claim 1 wherein the anchor forms the pivot point; and wherein rotating the UAV launcher about the pivot point while the UAV launcher remains anchored to the ground location includes:
    pivoting the frame of the UAV launcher about the anchor that forms the pivot point from a first direction to a second direction which is different from the first direction, the anchor having a form factor which is smaller than the UAV launcher.

11. A method as in claim 10 wherein positioning the UAV launcher over the ground location includes disposing the frame of the UAV launcher over a first ground area; and
    wherein installing the anchor into the ground location to anchor the UAV launcher to the ground location includes disposing the anchor into a second oblique ground area that is off to the side of the first ground area.

12. A method as in claim 10, further comprising:
    re-orienting a pair of wheels of the UAV launcher from a coaxial orientation to splayed orientation to transition the UAV launcher from a transportation mode to a launch mode prior to launching the UAV.

13. A method as in claim 1 wherein the UAV launcher is initially aimed in a first direction having an initial elevation and an initial azimuthal direction when the UAV launcher is operated to impart launching force onto the UAV to launch the UAV into the air from the ground location; and wherein rotating the UAV launcher about the pivot point includes:
    after the UAV launcher is initially aimed in the first direction and the UAV is launched into the air, pivoting the UAV launcher around the pivot point to aim the UAV launcher in a second direction having the initial elevation and a second azimuthal direction different from the initial azimuthal direction for a UAV launch in the initial elevation and the second azimuthal direction.

14. An unmanned aerial vehicle (UAV) launching apparatus, comprising:
    a UAV launcher constructed and arranged to impart launching force onto a UAV to launch the UAV into the air from a ground location; and
    an anchor assembly coupled to the UAV launcher, the anchor being constructed and arranged to:
       after the UAV launcher is positioned over the ground location and prior to launching the UAV into the air from the ground location, install into the ground location to anchor the UAV launcher to the ground location, and
       after the UAV launcher is anchored to the ground location, hold the UAV launcher substantially in place at the ground location to minimize energy loss as the UAV launcher imparts launching force onto the UAV;
    wherein the anchor is further constructed and arranged to permit rotation of the UAV launcher about a pivot point while the UAV launcher remains anchored to the ground location;
    wherein the UAV launcher includes a frame, a mount, and a propulsion mechanism that is constructed and arranged to move the mount relative to the frame during UAV launching;
    wherein the anchor is detached from the UAV launcher while the UAV launcher is positioned over the ground location; and
    wherein the anchor, when installed into the ground location, is constructed and arranged to:
       after the UAV launcher is positioned over the ground location and aimed in a particular direction, implant into the ground location and attach to the frame of the UAV launcher, the implanted anchor securing the frame of the UAV launcher to the ground location when the propulsion mechanism of the UAV launcher moves the mount of the UAV launcher relative to the frame of the UAV launcher to impart launching force onto the UAV during UAV launching.

15. A UAV launching apparatus as in claim 14 wherein the anchor is further constructed and arranged to anchor the UAV launcher to the ground (i) while the UAV launcher is initially aimed in a first direction to launch the UAV into the air from the ground location, (ii) while the UAV launcher is pivoted around the pivot point to aim the UAV launcher in a second direction that is different from the first direction, and (iii) while the UAV launcher is aimed in the second direction to launch the UAV into the air from the ground location.

16. A UAV launching apparatus as in claim 15 wherein the anchor and the pivot point are co-located; and wherein UAV launcher rotates about the anchor when the UAV launcher rotates about the pivot point.

17. A UAV launching apparatus as in claim 16 wherein at least a portion of the anchor is constructed and arranged to (i) disconnect the frame of the UAV launcher from the ground location to enable the UAV launcher to be moved away from the ground location during a first time period and (ii) reconnect the frame of the UAV launcher to the ground location to re-anchor the UAV launcher to the ground location during a second time period after the first time period.

18. A UAV launching apparatus as in claim 16 wherein the anchor includes:
    a base plate constructed and arranged to implant into the ground, and
    a coupler which couples to the based plate, the coupler being attached to the UAV launcher and being constructed and arranged to fasten to the base plate when the base plate is implanted into the ground.

19. A UAV launching apparatus as in claim 16 wherein the anchor includes:
    a curved track constructed and arranged to affix to the ground, and
    a guide attached to the UAV launcher, the guide being constructed and arranged to (i) ride along the curved track and (ii) fit within the curved track to enable the guide to ride along the curved track while the UAV launcher remains anchored to the ground location.

* * * * *